United States Patent
Melito et al.

(10) Patent No.: US 11,530,769 B2
(45) Date of Patent: Dec. 20, 2022

(54) REACTOR PRESSURE VESSEL INCLUDING PIPE RESTRAINT DEVICE, AND/OR PIPE RESTRAINT DEVICE

(71) Applicant: GE-Hitachi Nuclear Energy Americas LLC, Wilmington, NC (US)

(72) Inventors: Joel Patrick Melito, Wilmington, NC (US); Gerald Alan Deaver, Wilmington, NC (US); Randy Morris Brown, Wilmington, NC (US); Lorne Eugene Nix, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 287 days.

(21) Appl. No.: 16/591,971

(22) Filed: Oct. 3, 2019

(65) Prior Publication Data
US 2020/0116286 A1  Apr. 16, 2020

Related U.S. Application Data

(62) Division of application No. 14/982,047, filed on Dec. 29, 2015, now Pat. No. 10,473,255.

(51) Int. Cl.
*G21D 1/02* (2006.01)
*F16L 55/00* (2006.01)
(Continued)

(52) U.S. Cl.
CPC .......... *F16L 55/005* (2013.01); *G21C 13/032* (2013.01); *G21C 13/067* (2013.01);
(Continued)

(58) Field of Classification Search
CPC ....... F16L 55/175; F16L 15/005; F16L 23/04; G21C 13/076; G21C 13/032; G21C 17/017; G21C 19/207
See application file for complete search history.

(56) References Cited

U.S. PATENT DOCUMENTS

4,348,353 A * 9/1982 Christiansen .......... G21C 3/334
                                                       376/364
5,660,417 A * 8/1997 Reeves ................... F16L 23/18
                                                       116/201
(Continued)

FOREIGN PATENT DOCUMENTS

EP          1037215 A1   9/2000
JP       2015175402 A   10/2015

OTHER PUBLICATIONS

International Search Report and Written Opinion issued in connection with corresponding Application No. PCT/US2016/066282 dated Mar. 14, 2017.

*Primary Examiner* — Jack W Keith
*Assistant Examiner* — Joshua C Devorkin
(74) *Attorney, Agent, or Firm* — Harness, Dickey & Pierce, P.L.C.

(57) ABSTRACT

A reactor pressure vessel includes a reactor pressure vessel body, a nozzle structure connected to the reactor pressure vessel body, a conduit structure connected to the nozzle structure, and a restraint device attached around a portion of the conduit structure. The restraint device includes collar parts that have cross sections corresponding to respective segments of a periphery of the portion of the conduit structure, brackets attached to the nozzle structure, and rods connecting the brackets to the collar parts. The collar parts are connected end-to-end to each other such that a cross section of the collar parts connected to each other corresponds to the periphery of the portion of the conduit structure. The collar parts are pinned to each other. The brackets spaced apart from each other around a periphery of the nozzle structure.

4 Claims, 5 Drawing Sheets

(51) Int. Cl.
*G21C 17/017* (2006.01)
*G21C 13/067* (2006.01)
*G21C 13/032* (2006.01)
*G21C 19/20* (2006.01)
*G21C 13/02* (2006.01)

(52) U.S. Cl.
CPC ......... *G21C 17/017* (2013.01); *G21C 19/207* (2013.01); *G21D 1/02* (2013.01); *G21C 13/02* (2013.01); *Y02E 30/30* (2013.01)

(56) References Cited

U.S. PATENT DOCUMENTS

| | | | |
|---|---|---|---|
| 5,908,210 A * | 6/1999 | Fetzer | F16L 37/002 |
| | | | 285/24 |
| 6,264,203 B1 * | 7/2001 | Weems | G21C 15/25 |
| | | | 277/314 |
| 6,609,343 B1 | 8/2003 | Litten | |
| 2008/0107227 A1 * | 5/2008 | Koepke | G21C 17/017 |
| | | | 376/302 |
| 2009/0095849 A1 | 4/2009 | Parker et al. | |
| 2012/0032064 A1 | 2/2012 | Defilippis et al. | |
| 2016/0379724 A1 | 12/2016 | Carneal et al. | |

\* cited by examiner

REACTOR PRESSURE VESSEL INCLUDING PIPE RESTRAINT DEVICE, AND/OR PIPE RESTRAINT DEVICE

CROSS-REFERENCE TO RELATED APPLICATION

This application is a divisional of U.S. application Ser. No. 14/982,047, filed on Dec. 29, 2015, the entire contents of which are hereby incorporated by reference.

BACKGROUND

Field

The present disclosure relates to a pipe restraint device and/or a reactor pressure vessel including the same.

Description of Related Art

Conduit structures such as pipes may be used to supply fluids to a reactor pressure vessel. For example, conduit structures may be welded to nozzle structures. The nozzle structure may be arranged to transport fluid inside a reactor pressure vessel. Depending on the fluid supplied through the conduit structure and/or the operational environment, the conduit structure may deteriorate over time due to corrosion, vibrational fatigue, and/or other factors. Accordingly, as part of regular maintenance, conduit structures may be examined to inspect for damage and/or weakness.

A conduit structure may burst if the internal pressure of fluid inside the conduit structure is greater than the strength of the conduit structure at a particular location. In some reactor pressure vessels, the joint between a conduit structure and a nozzle structure may be adjacent to safety related components. Accordingly, in some reactor pressure vessels, a cooling system pool and/or bio-shield wall may be positioned between the safety related components and the conduit structure to limit and/or prevent damage to the safety related components if the conduit structure bursts near the joint between the conduit structure and the nozzle. However, the cooling system pool and bio-shield wall may have a large footprint and take up valuable space surrounding the reactor pressure vessel.

SUMMARY

At least one example embodiment relates to a restraint device for a conduit structure and/or a reactor pressure vessel including the same.

According to an example embodiment, a reactor pressure vessel includes a reactor pressure vessel body, a nozzle structure connected to the reactor pressure vessel body, a conduit structure connected to the nozzle structure, and a restraint device attached around a portion of the conduit structure. The restraint device includes collar parts that have cross-sections corresponding to respective segments of a periphery of the portion of the conduit structure, brackets attached to the nozzle structure, and rods connecting the brackets to the collar parts. The collar parts are connected end-to-end to each other such that a cross-section of the collar parts connected to each other corresponds to the periphery of the portion of the conduit structure. The collar parts are pinned to each other. The brackets are spaced apart from each other around a periphery of the nozzle structure.

The conduit structure may be a pipe.

The portion of the conduit structure may have an outer diameter that is greater than the outer diameter of a different location of the pipe, and the portion of the conduit structure may be one of integrally formed with the pipe and attached to the pipe.

The collar parts may each define threaded holes facing the brackets. The rods may be threaded rods and fit in the threaded holes.

The collar parts may be configured to be pivoted around the portion of the conduit structure when the collar parts are unpinned from each other and the rods are removed from the threaded holes.

The collar parts may include a first collar part and the second collar part. A size of the first collar part may be different than a size of the second collar part.

The restraint device may include one of Belleville washers between the portion of the conduit structure and at least one of the collar parts. The Belleville washers may be configured to absorb loads if the conduit structure breaks.

The restraint device may include engineered-crush material between the portion of the conduit structure and at least one of the collar parts. The engineered-crush material may be configured to absorb loads if the conduit structure breaks.

The rods may extend parallel to an axial direction of the conduit structure.

The collar parts may each include a protruded portion at one end and a recessed portion at an other end. The one end of each of the collar parts may define an opening that crosses through the protruded portion. The other end of each of the collar parts may define a hole that crosses through the recessed portion. The pins may extend through the openings of the protruded portions and the holes of the recessed portions to mate the protruded portion of each of the collar parts to the recessed portion of a corresponding one of the collar parts. The collar parts may be configured to be unpinned from each other if the pins are removed from through the openings of the protruded portions and the holes of the recessed portions.

The brackets may be clevis brackets. The clevis brackets may secured to the nozzle structure using clevis pins.

The restraint device may include locking nuts that secure the rods to the clevis brackets and the collar parts.

According to an example embodiment, a restraint device includes a plurality of collar parts connected end-to-end to each other such that a cross-section of the collar parts connected to each other defines a through hole, brackets spaced apart from the collar parts, and rods connected to the collar parts and the brackets. The collar parts are pinned to each other. The collar parts each include a side that defines a threaded hole.

The collar parts may each have a curved cross-section. The collar parts connected to each other may form a tube shape. The collar parts may each include a protruded portion at one end and a recessed portion at an other end. Two of the collar parts may be different sizes. The one end of the collar parts may define an opening that crosses through the protruded portion. The other end of the collar parts may define a hole that crosses through the recessed portion. The pins may extend through the openings of the protruded portions and the holes of the recessed portions to mate the protruded portion of each of the collar parts to the recessed portion of a corresponding one of the collar parts. The collar parts may be configured to be unpinned from each other if the pins are removed from through the openings of the protruded portions and the holes of the recessed portions.

The restraint device may further include one of Belleville washers attached to a surface of at least one of the collar parts. The Belleville washers may be in the through-hole if the collar parts are connected to each other.

The restraint device may further include engineered-crush material attached to a surface of at least one of the collar parts. The engineered-crush material may be in the through-hole if the collar parts are connected to each other.

The rods may extend to the brackets in a direction that is parallel to an axial direction of the through hole defined by the collar parts connected to each other.

The brackets may be clevis brackets.

At least one example embodiment relates to a method of attaching a restraint device to a conduit structure.

According to an example embodiment, a method of attaching a restraint device to a conduit structure is provided. The conduit structure is connected to a nozzle structure that includes brackets on an outer surface of the nozzle structure. The method includes inserting a first end of rods into the brackets such that a remaining part of each of the rods extends from the brackets over a portion of the conduit structure, connecting collar parts to the rods, and pinning the collar parts to each other end-to-end such that the collar parts pinned to each other to wrap around the portion of the conduit structure. The collar parts each include a side that defines a threaded hole. The connecting collar parts to the rods includes inserting a second end of each of the rods into a corresponding threaded hole among the threaded holes defined by the collar parts.

The method may further include inserting one of Belleville washers between the portion of the conduit structure and at least one of the collar parts.

The method may further include inserting engineered-crush material between the portion of the conduit structure and at least one of the collar parts.

The brackets may be clevis brackets connected to the nozzle structure using clevis pins.

At least one example embodiment also relates to a method of inspecting an area of a portion of a conduit structure that is covered by a restraint device.

According to an example embodiment, a method of inspecting an area of a portion of a conduit structure that is covered by a restraint device is provided. The conduit structure is connected to a nozzle structure that includes brackets on an outer surface of the nozzle structure. The restraint device includes collar parts that are pinned to each other end-to-end around the portion of the conduit structure. The collar parts are connected to the brackets by threaded bolts that are inserted in threaded holes defined by the collar parts. The collar parts each include a protruded portion at one end and a recessed portion at an other end. The protruded portion of each of the collar parts is mated to the recessed portion of a different one of the collar parts. The one end of the collar parts defines an opening that crosses through the protruded portion. The other end of the collar parts defines a hole that crosses through the recessed portion. The restraint device includes pins that are inserted through the openings of the protruded portions and the holes of the recessed portions. The method includes removing the threaded bolts from the threaded holes of the collar parts, unpinning two collar parts from each other by removing the pins that are used to pin the two collar parts to each other, and rotating the collar parts that remain pinned to each other around the portion of the conduit structure to expose the area of the conduit structure.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
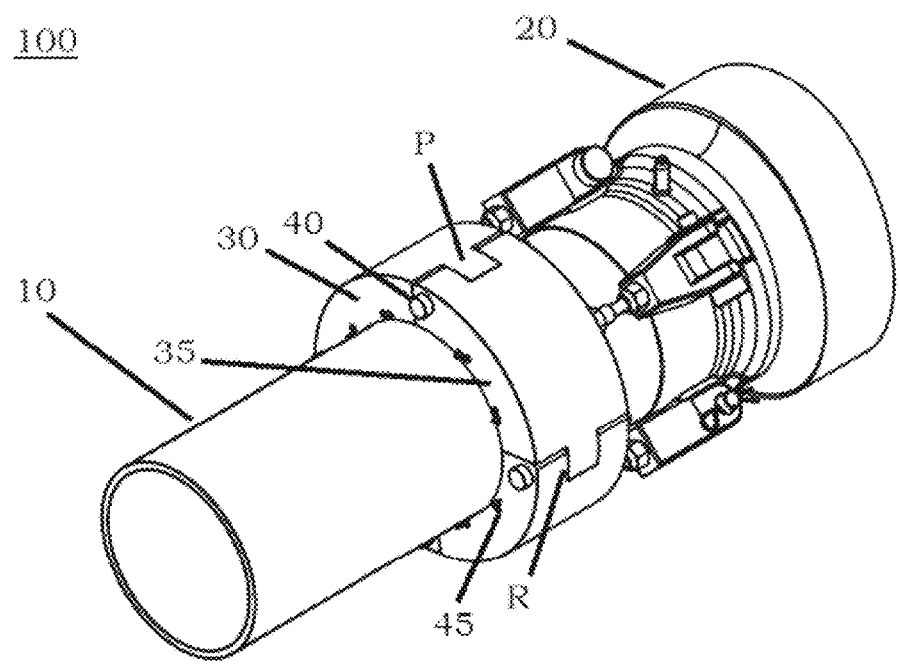
FIG. 1 illustrates a perspective view of a restraint device attached to a conduit structure according to an example embodiment.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, like reference numerals in the drawings denote like elements, and thus their description may be omitted.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
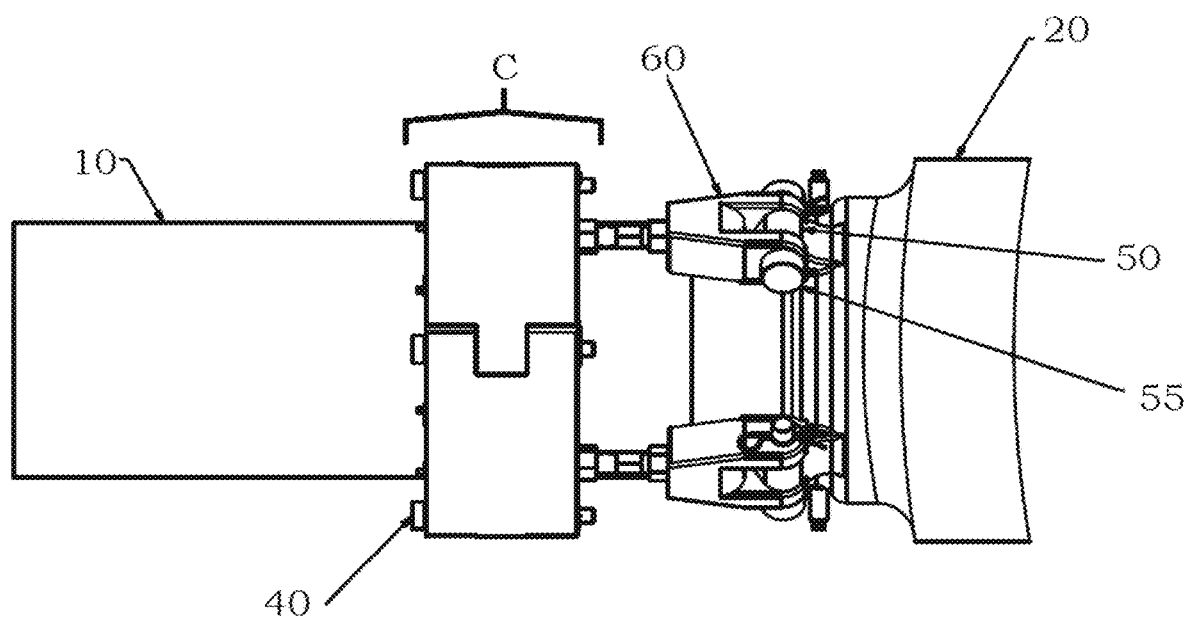
FIG. 2 illustrates a side view of the restraint device attached to the conduit structure in FIG. 1.
Figure 3:
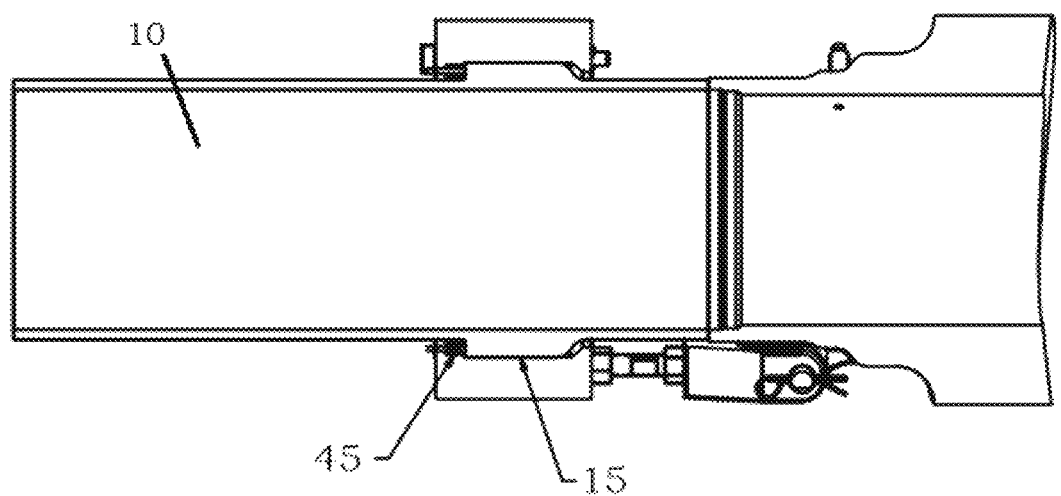
FIGS. 3-4 are sectional views of the restraint device attached to the conduit structure in FIG. 1.
Figure 4:
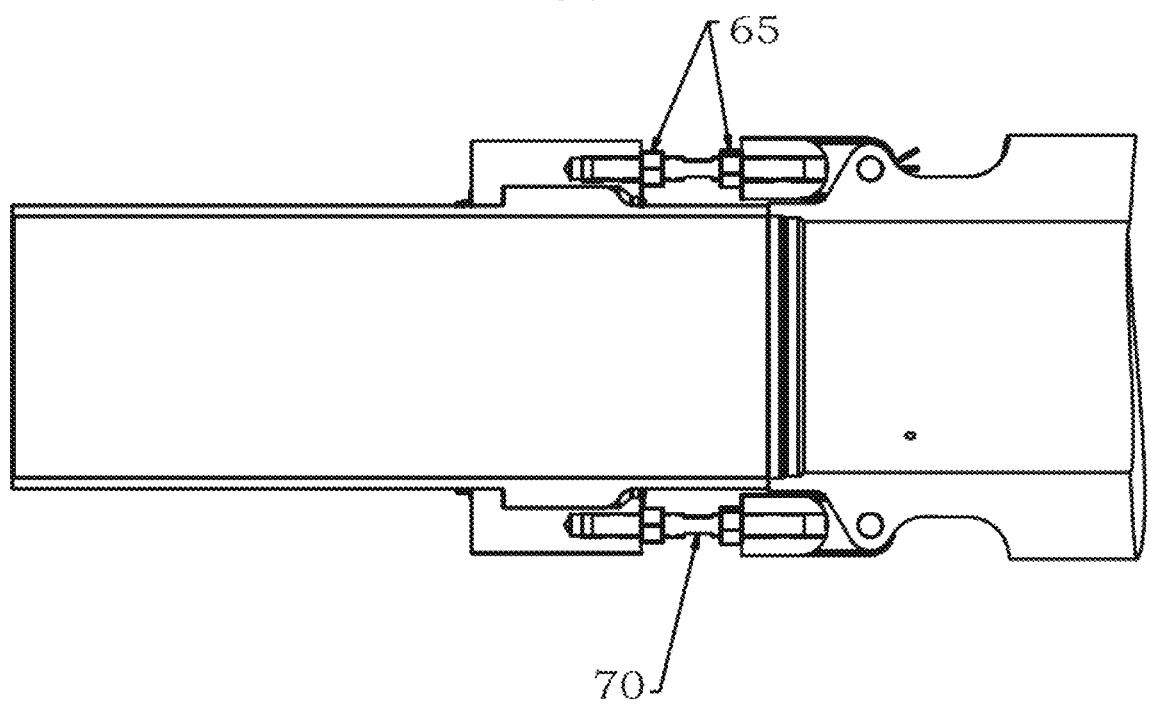

FIG. 1 illustrates a perspective view of a restraint device attached to a conduit structure according to an example embodiment. FIG. 2 illustrates a side view of the restraint device attached to the conduit structure in FIG. 1. FIGS. 3-4 are sectional views of the restraint device attached to the conduit structure in FIG. 1.

Referring to FIGS. 1-4, a restraint device 100 according to an example embodiment may include a plurality of collar parts. The restraint device 100 described with reference to FIGS. 1-4 is a separate and distinct structure from the conduit structure 10 and nozzle structure 20 in FIGS. 1-4. The example shown in FIGS. 1-4 includes a first collar part 30 and a second collar part 35, but example embodiments are not limited thereto and the number of collar parts may be an integer greater than or equal to 2. The collar parts, such as the first collar part 30 and the second collar part 35, may be formed of stainless steel, low alloy steel, and/or other metal alloys. However, example embodiments are not limited thereto and other materials may be suitable for forming the collar parts.

The collar parts may be different sizes. For example, a width of the first collar part 30 may be greater than a width the second collar part 35, or a width of the second collar part 35 may be greater than a width of the first collar part 30. Also, the first collar part 30 may correspond to a greater portion of the outer periphery of the conduit structure 10 compared to the second collar part 35 and vice versa. One of ordinary skill in the art would appreciate that the material of the collar part and/or dimensions (e.g., thickness) may be selected based on design considerations and the environment where the collar parts are installed.

The collar parts may be connected end-to-end to each other. A cross-section of the collar parts may define a through-hole if the collar parts are connected end-to-end to each other. For example, as shown in FIG. 1, the first collar part 30 and second collar part 35 may be connected end-to-end to each other by inserting a protruded portion P of the first collar part 30 into a recessed portion R of the second collar part 35 and by inserting a protruded portion P of the second collar part 35 into a recessed portion R of the first collar part 30. The structures of the first collar part 30 and the second collar part 35 are described later in more detail with reference to FIGS. 5-6 of the present application.

The collar parts may be pinned to each other. Additionally, the pins used to secure the collar parts to each other may be removed. For example, as shown in FIG. 2, a pin 40 may be used to secure the protruded portion P of the first collar part 30 to the recessed portion R of the second collar part 35. Similarly, a pin 40 may be used to secure the protruded portion P of the second collar part 35 to the recessed portion R of the first collar part 30. The pin 40 may be formed of the same material as the first collar part 30 and/or second collar part 35. Alternatively, the pin 40 may be formed of a different material than the collar parts 30 and 35. When the collar parts are connected end-to-end to each other, the collar parts may define a collar C. The collar C may be arranged around a portion of the conduit structure 10.

The conduit structure 10 may be a pipe, or similar structure for transporting a fluid, and may be connected to the nozzle structure 20. For example, the conduit structure 10 may be connected to the nozzle structure 20 by welding the conduit structure 10 to the nozzle structure 20. In some embodiments, the conduit structure 10 may be a pipe that is configured to deliver a fluid (e.g., a steam and/or water liquid mixture) to a reactor pressure vessel body. The nozzle structure 20 may be connected to the reactor pressure vessel body and configured to deliver the fluid to the reactor pressure vessel body. The conduit structure 10 and/or nozzle structure 20 may be formed of stainless steel, low alloy steel, and/or other metal alloys. However, example embodiments are not limited thereto and other materials for forming the conduit structure 10 and/or nozzle structure 20 may be suitable.

The restraint device 100 may attach around a portion of a conduit structure 10. Once attached to the portion of the conduit structure 10, the restraint device 100 may be detached from around the portion of the conduit structure 10. The collar parts such as the first collar part 30 and second collar part 35 may have cross-sections corresponding to respective segments of a periphery of the conduit structure 10. For example, as shown in FIG. 1, in a non-limiting example where the conduit structure 10 may be a tubular pipe, the first collar part 30 may have a curved cross-section that is sized to wrap around a first portion of the conduit structure 10, and the second collar part 35 may have a curved cross-section that is sized to wrap around a second portion of the conduit structure 10. If the first collar part 30 and second part 35 are connected to end-to-end to each other, a cross section of the collar parts 30 and 35 connected to each other may correspond to a periphery (e.g., outer diameter) of the conduit structure 10. Additionally, the collar parts 30 and 35 may be sized to provide a clearance between the periphery (e.g., outer diameter) of the conduit structure 10 and the surface of the collar parts 30 and 35 when the collar parts 30 and 35 wrap around the conduit structure 10. The clearance may be in a range from ⅛ of an inch to 2 inches, but is not limited thereto.

The restraint device 100 may include brackets 60. The brackets 60 may be attached to the nozzle structure 20 and/or may be detached from the nozzle structure 20. The brackets 60 may be spaced apart from the collar parts 30 and 35. The brackets 60 may be spaced apart from each other around a periphery of the nozzle structure 20. As shown in FIG. 4, rods 70 (or bolts) may be connected to the brackets 60 and the collar parts 30 and 35. In other words, opposite ends of the rods 70 may be connected to the brackets 60 and the collar parts 30 and 35, respectively.

In FIGS. 1-4, a non-limiting example is shown where each of the collar parts 30 and 35 are connected to one of the brackets 60. However, in different implementations, the collar parts may be connected to a plurality of the brackets 60 and/or different numbers of the brackets 60, respectively. For example, one of ordinary skill in the art would recognize that the restraint device 100 shown in FIGS. 1-4 may alternatively include a plurality of the brackets 60 (e.g., 2 or more) connected to the first collar part 30 and/or a plurality of the brackets 60 (e.g., 2 or more) connected to the second collar part 35. Additionally, the number of brackets 60 connected to the first collar part 30 may be different than the number of brackets 60 connected to the second collar part 35.

The threaded rods 70 may be inserted into the collar parts 30 and 35. For example, FIG. 5 of the present application illustrates a side of the first collar part 30 may define a threaded hole TH and FIG. 6 of the present application illustrates that a side of the second collar part 35 may define an opening O'. The opening O' may be a threaded opening O'. The rod 70 shown in FIG. 4 may be a threaded rod. A first end of the rod 70 may be threaded and may be inserted into the threaded hole TH of the first collar part 30 and/or inserted into the opening O' of the second collar part 35 in order to secure the rod 70 to the first collar part 30 and/or secure the rod 70 to the second collar part 35. A locking nut 65 may be placed around the rod 70 to further secure the rod 70 to the first collar part 30 and/or secure the rod 70 to the second collar part 35. The locking nut 65 may contact a corresponding one of the collar parts such as the first collar part 30 and/or the second collar part 35.

When the collar parts such as the first collar part 30 and second collar part 35 are connected end-to-end and wrapped around the conduit structure 10, the threaded hole TH (see FIG. 5) of the first collar part 30 and the opening O' of the second collar part 35 (see FIG. 6) may face the brackets 60 attached to the nozzle structure 20. The rods 70 may be threaded at ends and may fit in the threaded hole TH (see FIG. 5) of the first collar part 30 and/or the configured to fit in the opening O' of the second collar part 35 (see FIG. 6).

The brackets 60 may be clevis brackets and may be attached to the nozzle structure using a clevis connection 50. A clevis pin 55 may secure each of the brackets 60 to a corresponding one of the clevis connections 50. The brackets 60, clevis connections 50, and/or clevis pins 55 each may be formed of stainless steel, low alloy steel, and/or other metal alloys, but are not limited thereto and other materials may be suitable.

The conduit structure 10 may include a raised surface that is configured to limit and/or reduce break loads if the conduit structure 10 breaks near the joint between the conduit structure 10 and the nozzle structure 20. For example, referring to FIG. 3, the portion 15 of the conduit structure 10 where the restraint device 100 may attach around may have an outer dimension and/or a wall thickness that is greater than an outer dimension and/or wall thickness of a different location of the conduit structure 10 where the restraint device 100 is not attached around. For example, if the conduit structure 10 is a pipe, the portion 15 of the pipe 10 may have an outer diameter and/or wall thickness that is greater than an outer diameter and/or wall thickness of a different location of the pipe.

The portion 15 of the conduit structure 10 (e.g., pipe) may be integrally formed with the conduit structure 10 (e.g., pipe) or attached to the conduit structure 10. For example, the wall of the conduit structure 10 may be thicker at the portion 15 of the conduit structure 10 compared to other locations of the conduit structure 10. Alternatively, another structure may be welded to the outer periphery of the conduit structure 10 to define the portion 15 of the conduit structure 10, or secured to the outer periphery of the conduit structure 10 using other methods to define the portion 15 of the conduit structure 10.

Referring to FIG. 4, a second end of each of the rods 70 may be threaded and may fit in a threaded opening of a corresponding one of the brackets 60 to secure the rods 70 to the brackets 60. Locking nuts 65 may be attached around the rods 70 and tightened to further secure the rods 70 to the brackets 60. Two locking nuts 65 may be spaced apart from each other along each of the rods 70 to secure respective ends of the rods 70 to the collar parts (e.g., 30 and 35) and the brackets 60 respectively.

By inserting respective ends of the rods 70 into the collar parts 30 and 35 and the brackets 60, the rods 70 may be arranged to extend parallel to an axial direction of the conduit structure 10. If the rods 70 are not parallel to the axial direction of the conduit structure 10, then the rods 70 may create a moment in the combined structure of conduit structure 10 connected to the nozzle structure 20 and the rods 70 connected to the collar parts 30 and 35 and the brackets 60.

The collar parts 30 and 35 in FIGS. 1-4 may be configured to be pivoted around the portion (e.g., portion 15 in FIG. 3) of the conduit structure 10 when the collar parts 30 and 35 are unpinned from each other and the rods 70 are removed from the collar parts 30 and 35.

As shown in FIGS. 1 and 3, Belleville washers 45 may be placed between an outer surface of the conduit structure 10 and an inner surface of the collar parts 30 and 35. The Belleville washers 45 may be configured to absorb loads if the conduit structure 10 breaks. The Belleville washers 45 may be formed of the same materials as the collar parts 30 and 35.

Figure 5:
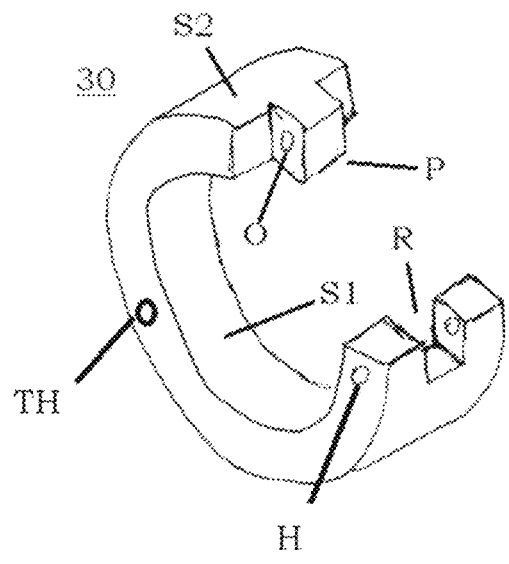
FIG. 5 is a perspective view of a first collar part of a restraint device according to an example embodiment.

FIG. 5 is a perspective view of a first collar part of a restraint device according to an example embodiment.

Referring to FIG. 5, the first collar part 30 may include a first surface S1 that is opposite a second surface S2. A side of the first collar part 30 may define a threaded hole TH. The threaded hole TH may extend though the side of the first collar part 30 or only partially into the side of the first collar part 30. The first collar part 30 may have a cross-section that corresponds to a segment of a conduit structure. For example, if the conduit structure is curved, the first collar part 30 may have a curved cross-section that corresponds to a segment of a curved shaped (e.g., circle or ellipse, but not limited thereto).

The first collar part 30 includes a protruded portion P at one end and a recessed portion R at an other end. The one end of the first collar part 30 may define an opening O that crosses through the protruded portion P. The other end of the first collar part 30 may define a hole H that crosses through the recessed portion. The opening O and hole H may be the same size.

Even though FIG. 5 illustrates only one threaded hole TH defined in the side of the first collar part 30, example embodiments are not limited thereto. The number of threaded holes TH defined in the side of the first collar part 30 may be an integer greater than one. For example, the number of threaded holes TH may be greater than or equal to the number of rods 70 that will be inserted in the first collar part 30. When the first collar part 30 defines a plurality of threaded holes TH, the threaded holes TH may be spaced apart from each other. Similarly, the first collar part 30 could be modified to include a plurality of protruded portions P spaced apart from each other at the one end and/or a plurality of the recessed portions R spaced apart from each other at the other end.

Figure 6:
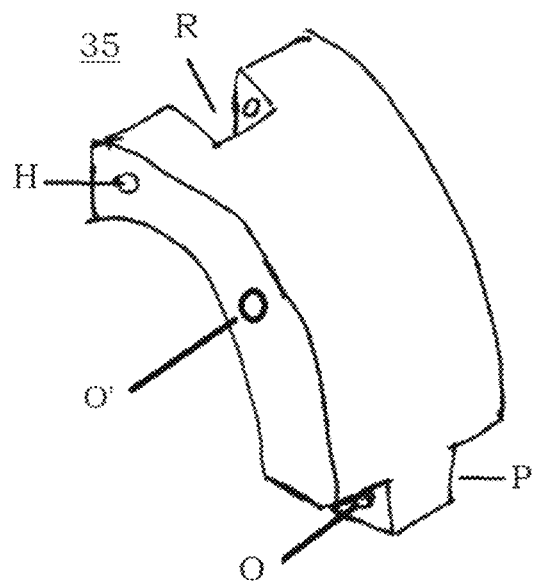
FIG. 6 is a perspective view of a second collar part of a restraint device according to an example embodiment.

FIG. 6 is a perspective view of a second collar part of a restraint device according to an example embodiment.

Referring to FIG. 6, a side of the second collar part 35 may define an opening O' and the opening O' may be threaded. In other words, the opening O' may be the same as or similar in structure to the threaded hole TH defined in the first collar part 30. The opening O' may extend though the side of the second collar part 36 or only partially into the side of the second collar part 35. The second collar part 36 may have a cross-section that corresponds to a segment of a conduit structure. For example, the second collar part 36 may have a curved cross-section that corresponds to a segment of a curved shaped (e.g., circle or ellipse, but not limited thereto).

The second collar part 35 may include a protruded portion P at one end and a recessed portion R at an other end. The one end of the second collar part 35 may define an opening O that crosses through the protruded portion P. The other end of the second collar part 35 may define a hole H that crosses through the recessed portion. The opening O and hole H may be the same size.

Even though FIG. 6 illustrates only one opening O' defined in the side of the second collar part 35, example embodiments are not limited thereto. The number of openings O' defined in the side of the second collar part 35 may be an integer greater than one. For example, the number of openings O' may be greater than or equal to the number of rods 70 that will be inserted in the second collar part 35. When the second collar part 35 defines a plurality of openings O', the openings O' may be spaced apart from each other.

Figure 7:
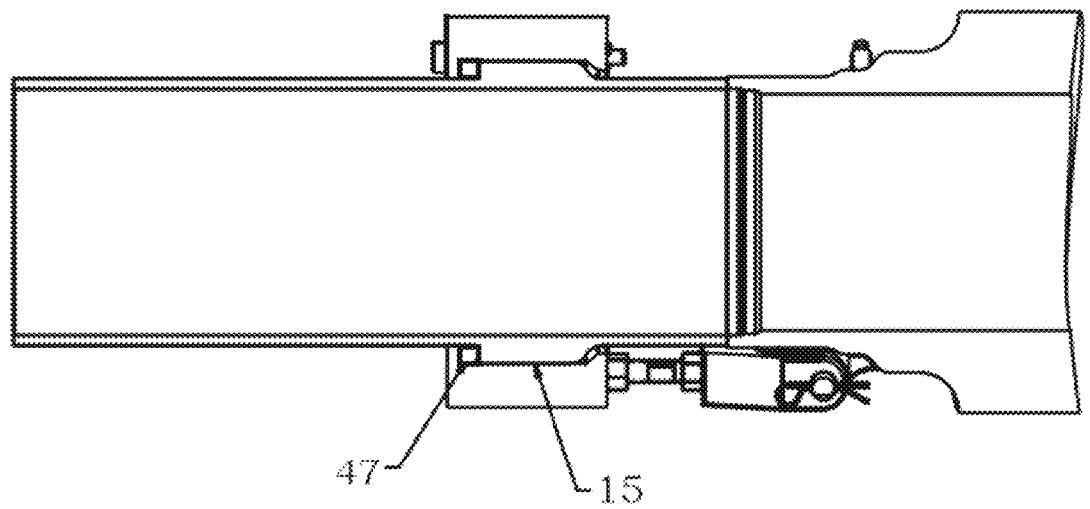
FIG. 7 illustrates a sectional view of a restraint device attached to a conduit structure according to an example embodiment.

FIG. 7 illustrates a sectional view of a restraint device attached to a conduit structure according to an example embodiment.

Referring to FIG. 7, a restraint device 200 according to an example embodiment may be the same as (or substantially the same as) the restraint device 100 described previously with respect to FIGS. 1-4, except the restraint device 200 shown in FIG. 7 may include engineered-crush materials 47 between the collar parts 30 and 35 instead of the Belleville washers 45 (see FIG. 3). The restraint device 200 described with reference to FIG. 7 is a separate and distinct structure from the conduit structure 10 and nozzle structure 20 in FIG. 7.

The engineered-crush materials 47 may be designed to be expendable and/or replaceable parts for one-time use. The engineered-crush materials 47 may be configured to absorb loads if the conduit structure 10 (e.g., a pipe) breaks and/or bursts. The engineered-crush materials 47 may be made from metals, high quality metal alloys, and/or engineered composite materials. For example, suitable alloys for forming the engineered-crush materials 47 include 300-series stainless steels and nickel alloys such as Alloys 600, 625, 718, X-750 or 925, but are not limited thereto. The engineered-crush materials 47 may be formed of using a high quality spring wire as a feed material. For example, several material specifications such as ASTM A-228 music wire or ASTM A679 high-tensile hard drawn wire may be used as the high quality spring wire as a feed material for forming the engineered crush materials 47.

The engineered crush materials 47 may be formed from composite materials selected based on their desired properties (e.g., relative stiffness, tensile strength, insulating, and/or non-magnetic). For example, the desired stiffness and/or tensile strength for engineered crush materials 47 may be a design parameter determined through empirical study. Galvanic corrosion may be observed in environments where dissimilar metals and a solute (e.g., water) exist. Accordingly, the engineered-crush materials 47 may be formed using an insulating material having non-magnetic properties in order to limit and/or reduce problems such as galvanic corrosion.

The engineered crush materials 47 may be formed in several configurations and structural arrangements. For example, the engineered crush materials 47 may have a form or pattern that is an array of regular cells such as a honeycomb. Alternatively, the engineered-crush material 47 may have an irregular form such as a spun metal-wire pad (e.g., similar to a scrubbing or abrasive pad) or a metal foam.

Processing controls may be used to limit the range and variation of gaps or hollow spaces formed between solid portions of the engineered crush materials. For example, one example of a processing control may include using hollow refractory-metal (e.g., tungsten) beads and an interspace metallic or composite material that are bonded together by relatively conventional metal casting method or a hot isostatic-press method. Pre-manufactured foams of various densities can also be post-processed, for example by partially pressing a lower density foam to create a uniformly denser material. The various processes may be use to form pre-engineered full-crush compression lengths with a controlled loading rate and ultimate load capacity.

Additionally, 3D-printing or additive manufacturing techniques may be used to form engineered crush materials 47 of finished dimensions that combine both intricate and variable cellular patterns and densities with multiple alloyed or blended materials, including some composites. By using 3D-printing, parts of engineered-crush materials 47 may be created with unique material compositions. For example, one approach may include forming an engineered crush material 47 that includes a metal cellular structure or a metal foam with integrated composite-coated beads containing a soft material. The soft material may be one of graphite powder, chopped filaments, elastomers or polymers (e.g., nitrile-butadiene rubber, neoprene, ethylene-propylene-diene-monomer [EPDM], or fluoroelastomer [FKM]) where the encapsulated soft-material can be squeezed out during the crush event so that it acts as a version of hydraulic brake or damper. Because a part formed from the engineered crush materials 47 may be formed in two or more pieces for one-time use, and is expected to be replaced after an event, this discharge of soft material may be an acceptable behavior.

In some example embodiments, when one of the above-described restraint devices is attached around a pipe connected to a nozzle structure of a nuclear reactor, the soft material in the engineered crush materials 47 would need to formed from accepted nuclear-grade materials or from materials approved for nuclear applications.

Figure 8:
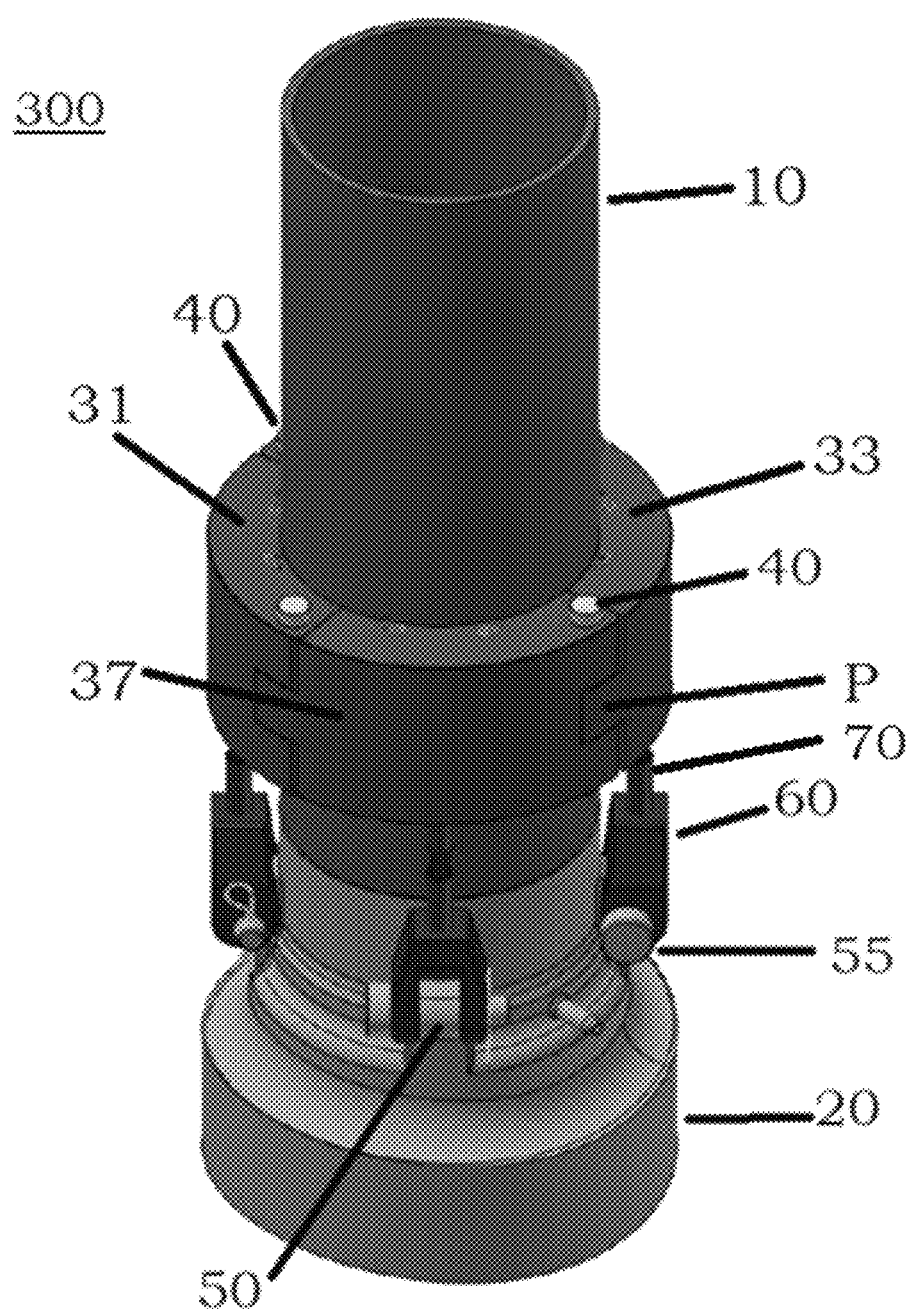
FIG. 8 is a perspective view of a restraint device attached to a conduit structure according to an example embodiment.

FIG. 8 is a perspective view of a restraint device 300 attached to a conduit structure according to an example embodiment.

Referring to FIG. 8, the restraint device 300 shown in FIG. 8 may be the same as (or substantially the same as) the restraint devices 100 and 200 previously described with reference to FIGS. 1-4, 5-6, and 7, except for the number of collar parts attached around the conduit structure 10. The restraint device 300 described with reference to FIG. 8 is a separate and distinct structure from the conduit structure 10 and nozzle structure 20 in FIG. 8. Unlike the restraint devices 100 and 200, the plurality of collar parts in the restraint device 300 may include 3 collar parts: a first collar part 31, a second collar part 33, and a third collar part 37. The collar parts 31, 33, and 37 may be different sizes. The collar parts 31, 33, and 37 may be pinned to each other using the pins 40 or to be unpinned from each other by removing the pins 40. The collar parts 31, 33, and 37 may be connected end-to-end by inserting the protruded portion P of one of the collar parts 31, 33, and 37 into the recessed portion R of a different one of the collar parts 31, 33, and 37. Rods may be connected between the collar parts 31, 33, and 37 and brackets 60 attached to the nozzle structure 20.

Referring to FIGS. 1-4, 5-6, and 7, the first collar part 30 and the second collar part 35 may be pinned together if the protruded portion P of the collar parts 30 and 35 are mated to the corresponding recessed portions of the collar parts 30 and 35, based on inserting pins through the openings O of the protruded portions P and the holes H of the recessed portions. The collar parts 30 and 35 may be unpinned from each other by removing the pins 40 from through the openings O of the protruded portions P and the holes H of the recessed portions R. Referring to FIG. 8, the collar parts 31, 33, and 37 may be pinned to each other and/or unpinned from each other similar to the collar parts 30 and 35 described with reference to FIGS. 1-4, 5-6, and 7.

According to some example embodiments, various methods may be used to attach any one of the restraint devices 100, 200, and/or 300 described above with reference to FIGS. 1-4, 5-6, 7, and 8 to a conduit structure 10 connected to a nozzle structure 20. The nozzle structure 20 may include brackets 60 on an outer surface of the nozzle structure 20. For example, referring to FIGS. 1-6 and/or 7, in an example embodiment, the method may including inserting a first end of the rods 70 into the brackets 60 such that a remaining part of each of the rods 70 extends from the brackets 60 to over a portion of the conduit structure 10, and connecting the collar parts 30 and 35 to the rods 70. The brackets 60 may be clevis brackets connected to the nozzle structure 20 using clevis pins 55.

The first collar part 30 and the second collar part 35 may define a threaded hole TH and an opening O', respectively. The opening O and hole H may be the same size and similar (or the same) in structure. The connecting collar parts 30 and 35 to the rods 70 may include inserting a second end of each of the rods 70 into a corresponding threaded hole TH (and/or opening O') among the threaded holes TH (and/or openings O') defined by the collar parts 30 and 35. For example, FIG. 4 illustrates the second end of the rods 70 may be inserted into the collar parts 30 and 35.

Then, the collar parts 30 and 35 may be connected end-to-end to each other and arranged so the collar parts 30 and 35 wrap around the portion of the conduit structure 10 and form the collar C (see FIG. 2). At this time, the collar parts 30 and 35 may be pinning using the pins 40 to each other end-to-end such that the collar parts 30 and 35 pinned to each other wrap around the portion of the conduit structure 10. For example, as shown in FIGS. 1 and/or 5, the first collar part 30 and second collar part 35 may be connected end-to-end to each other by inserting a protruded portion P of the first collar part 30 into a recessed portion R of the second collar part 35 (see FIG. 6) and by inserting a protruded portion P of the second collar part 35 (see FIG. 6) into a recessed portion R of the first collar part 30. The pins 40 may be inserted through the openings defined by the protruded portions P and the holes H defined by the recessed portions R, respectively, of the first and second collar parts 30 and 35 when the first and second collar parts 30 and 35 are connected end-to-end to each other.

Optionally, in some example embodiments, the method may further include inserting one of Belleville washers 45 (see FIG. 3) and engineered-crush material 47 (see FIG. 7) between the portion of the conduit structure 10 and at least one of the collar parts 30 and 35. For example, the Belleville washers 45 and/or engineering-crush material 47 may be placed on the conduit structure 10 before the collar parts 30 and 35 are connected end-to-end and arranged to wrap around the portion of the conduit structure 10.

In some example embodiments, locking nuts 65 may be placed on the rods 70 to secure the first end of the rods 70 to the brackets 60 and/or to secure the second end of the rods to the collar parts 30 and 35.

In an example embodiment, a method of attaching the restraint device 300 to the conduit structure 10 connected to the nozzle structure may be performed similar to the method of attaching the restraint devices 100 and 200 to the conduit structure 10 connected to the nozzle structure 20. However, because the restraint device 300 in FIG. 8 includes three collar parts 31, 33, and 37 instead of the two collar parts 30 and 35 for the restraint devices 100 and 200 in FIGS. 1-4, 5-6, and 7, there are several differences.

For example, when attaching the restraint device 300 to the conduit structure 10, respective ends of the rods 70 are connected into the three collar parts 31, 33, and 37 and corresponding brackets 60. The collar parts 31, 33, and 37 are connected to end-to-end to each other to wrap around the portion of the conduit structure 10, then the pins 40 are placed through the recessed portions and protruded portions of the collar parts 31, 33, and 37 mated to each other in order to further secure the collar parts 31, 33, and 37 to each other. Optionally, the method may further include inserting one of Belleville washers 45 (see FIG. 3) and engineered-crush material 47 (see FIG. 7) between the portion of the conduit structure 10 and at least one of the collar parts 31, 33, and 37.

Alternatively, in an example embodiment, the collar parts (e.g., 30 and 35) may be connected end-to-end to each other around the portion of the conduit structure 10. Then, pins 40 may be inserted through the protruded portions P and recessed portions R of the collar parts to pin the collar parts to each other. Then, respective ends of rods 70 may be connected to the collar parts and brackets 60 attached to the nozzle structure 20. Also, locking nuts 65 may be used to the secure the rods 70 to the collar parts and the brackets 60.

According to some example embodiments, various methods may be used to inspect an area of a conduit structure 10 that is covered by one of the restraint devices 100, 200, and/or 300 described above with reference to FIGS. 1-6, 7, and 8. For example, as described above, any one of the restraint devices 100, 200, and 300 may be attached to a conduit structure 10 connected to a nozzle structure 20 that includes brackets 60 on an outer surface of the nozzle structure 20. Any one of the restraint devices 100, 200, and/or 300 may include collar parts (e.g., 30 and 35 for the restraint devices 100 and 200, or the collar parts 31, 33, and 37 for the restraint device 300) that are pinned to each other end-to-end around the portion of the conduit structure 10. The collar parts may be connected to the brackets 60 by threaded rods 70 (or bolts) that are inserted in threaded holes TH (and/or openings O') that are defined by the collar parts. The collar parts may each include a protruded portion and one end and a recessed portion at an other end. The protruded portion of each of the collar parts may be mated to the recessed portion of a different one of the collar parts. The one end of the collar parts may define an opening that crosses through the protruded portion P (see FIG. 5). The other end of the collar parts may define a hole H that crosses through the recessed portion R (see FIG. 6). The restraint devices 100, 200, and 300 may include pins 40 that inserted through the openings of the protruded portions and the holes of the recessed portions.

In an example embodiment, the method of inspecting the area of the portion of the conduit structure that is covered by one of the restraint devices 100, 200, and/or 300 may include removing the threaded rods 70 (or bolts) from the threaded holes TH (or openings O') of the collar parts, unpinning two collar parts from each other by removing the pins 40 that are used to pin the two collar parts to each other, and rotating the collar parts that remain pinned to each other around the portion of the conduit structure to expose the area of the conduit structure 10.

For example, referring to FIG. 8, in order to inspect the area of the conduit structure 10 that is covered by the third collar part 37, the rod 70 connected between the third collar part 37 and the corresponding bracket 60 may be removed from the third collar part 37. Then, the pin 40 that connects the recessed portion of the third collar part 37 to the protruded portion P of the second collar part 33 may be removed. Then, the pin 40 that connects the protruded portion P of the third collar part 37 to the recessed portion R of the first collar part 31 may be removed. Next, the third collar part 37 may be separated from the first collar part 31 and the second collar part 33 to expose the area of the conduit structure 10 that was previously covered by the third collar part 37 and also leave in place the first and second collar parts 31 and 33 connected to each other around part of the conduit structure 10.

The first and second collar parts 31 and 33, which remain pinned to each other around part of the portion of the conduit structure 10 and expose the area that was previously covered by the third collar part 37, may be rotated (or pivoted) in a clockwise direction or a counterclockwise direction around the conduit structure 10. If the first and second collar parts 31 and 33 are rotated a clockwise direction by an amount corresponding to the size of the first collar part 31, then the area of the conduit structure 10 that was previously covered by the first collar part 31 may be exposed and inspected and the second collar part 33 may cover at least part of the area of the conduit structure 10 that was previously covered by the third collar part 37.

Alternatively, if the first and second collar parts 31 and 33 are rotated (or pivoted) in a counterclockwise direction by an amount corresponding to the size of the second collar part 33, then the area of the conduit structure 10 that was previously covered by the second collar part 33 may be exposed and inspected and the first collar part 31 may cover at least part of the area of the conduit structure 10 that was previously covered by the third collar part 37.

Figure 9:
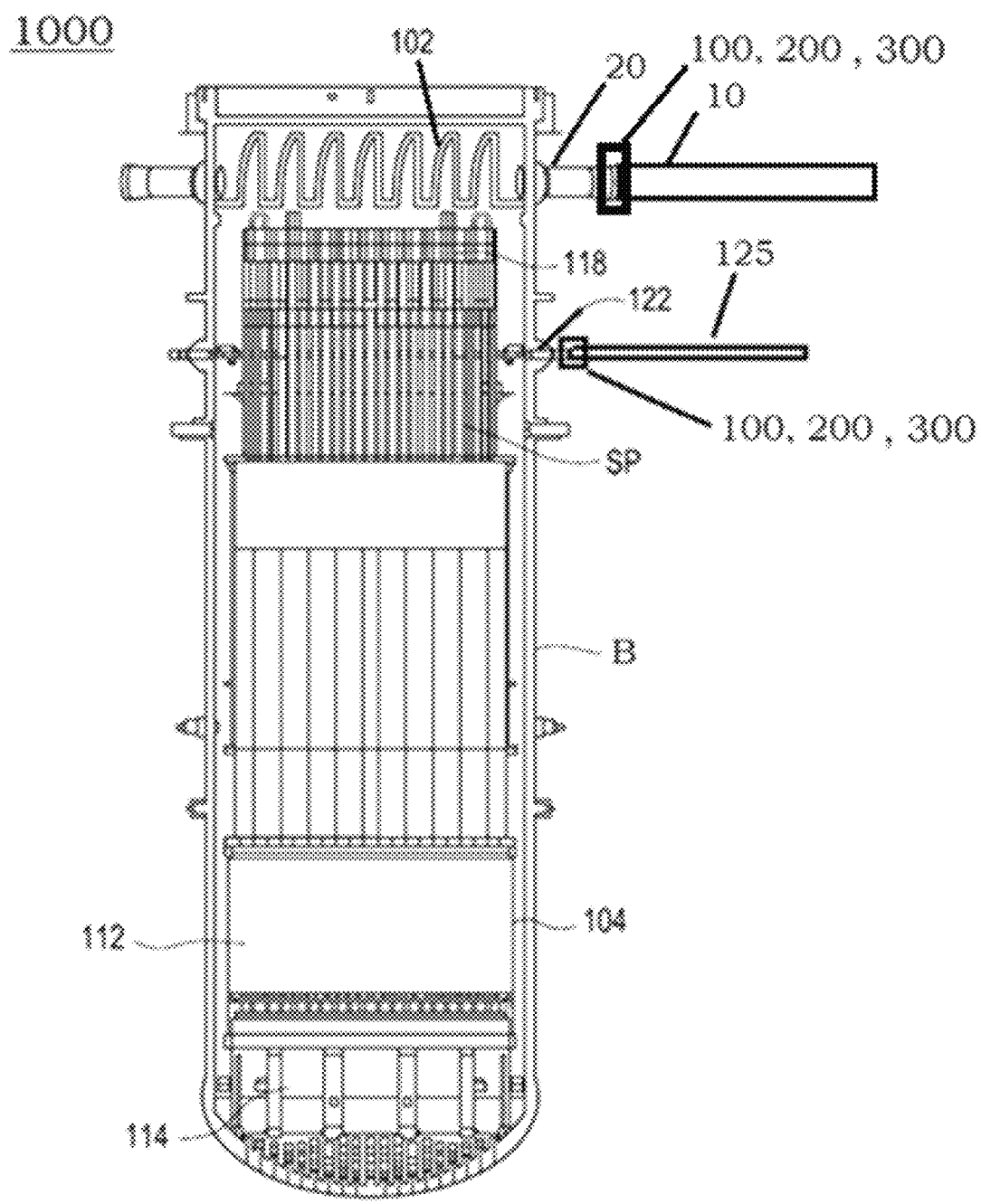
FIG. 9 is a sectional view of a reactor pressure vessel connected to a restraint device attached to a conduit structure according to an example embodiment.

FIG. 9 is a sectional view of a reactor pressure vessel connected to a restraint device attached to a conduit structure according to an example embodiment.

A nuclear reactor pressure vessel assembly is described in U.S. patent application Ser. No. 14/751,690 (filed on Jun. 26, 2015), the entire contents of which is incorporated herein in by reference.

Although the nuclear reactor pressure vessel in FIG. 9 is illustrated without top head (e.g., reactor vessel head), one of ordinary skill in the art would appreciate that a top head may be connected to a top of the reactor body B shown in FIG. 9 in order to enclose the contents within the reactor body B.

Referring to FIG. 9, the nuclear reactor pressure vessel 1000 may include a body B that surrounds a core inlet region 114, a shroud 104, a reactor core 112, stand pipes SP, steam separators 118, a steam dryer 102, and other components. The body B may be the vertical wall of the reactor pressure vessel 1000. The reactor core 112 is over the core inlet region 114. The steam separators 118 are over the reactor core 112 and the stand pipes SP. The steam dryer 102 may be connected on top of the steam separators 118.

A nozzle structure such as the reactor pressure vessel main steam nozzle 20 (hereinafter main stream nozzle 20) may be connected to an opening defined in the body B. A conduit structure 10 such as a pipe may be outside the reactor body B and connected (e.g., welded) to the main steam nozzle 20. The conduit structure 10 connected to the main steam nozzle 20 may be configured to remove one or more fluids (e.g., steam) from the reactor pressure vessel 1000. For example, the main steam nozzle 20 may be arranged to transport fluid from the reactor pressure vessel 1000. A feedwater nozzle 122 may be connected to a feedwater opening defined in the body B. A conduit structure 125 such as a main feedwater pipe 125 may be outside the reactor body B and connected (e.g., welded) to the feedwater nozzle 122. The main feedwater pipe 125 connected to the feedwater nozzle 122 may be configured to supply one or more fluids (e.g., water and/or steam) to the reactor pressure vessel 1000. For example, the feedwater nozzle 122 may be arranged to transport fluid inside the reactor pressure vessel 1000.

One of the restraint devices 100, 200, and 300 according to example embodiments described above in FIGS. 1-6, 7, and 8 (and/or variations thereof) may be attached around a portion of the conduit structure 10 that is outside the body B and adjacent to the joint between the conduit structure 10 and the main steam nozzle 20.

Although not illustrated, various safety related components may be arranged outside of the body B, near the joint between the conduit structure 10 and the main steam nozzle 20. By attaching one of the above-described restraint devices 100, 200, and 300 around the conduit structure 10, the restraint device may protect the safety-related components from fluids if the conduit structure 10 bursts and/or breaks and may take up a smaller footprint than a cooling system pool and/or bio-shield wall used in general reactor pressure vessels.

Additionally, the restraint devices 100, 200, and 300 are configured to limit and/or contain loads created by a break in the conduit structure 10 without overloading other structures. For example, the conduit structure 10 may include a portion 15 (see FIG. 3) with a raised surface to limit and/or restrict loads created from a break in the conduit structure 10. Also, Belleville washers 45 and/or engineered-crush material 47 may be positioned between the conduit structure 10 and the collar parts wrapped around the conduit structure 10 in order to absorb loads if the conduit structure 10 breaks or bursts. Additionally, because the collar parts may be connected end-to-end to each other around a portion of the conduit structure 10, the collar parts may be configured to at least partially contain a break in the conduit structure 10 at a location surrounded by the collar parts (e.g., 31 and 35).

Additionally, the restraint devices 100, 200, 300 may be assembled and/or disassembled using a simplified process. Thus, in some example embodiments, the restraint devices 100, 200, 300 may be attached to the conduit structure 10 connected to the main steam nozzle 20 using a simplified process. Additionally, for maintenance inspection, the restraint devices 100, 200, and 300 may be quickly disassembled to gain access to locations of the conduit structure 10 and/or nozzle structure 20. Alternatively, for maintenance inspection and/or for responding to a conduit structure burst, in some example embodiments, one or more of the collar parts of the restraint devices 100, 200, and 300 may be removed and the remaining collar parts may be rotated (or pivoted) to inspect a location of the conduit structure 10 and/or at least partially contain a location of conduit structure burst or break.

One of ordinary skill in the art would appreciate that the restraint devices 100, 200, 300 described above is not limited to being attached around the conduit structure 10 and may be used in other applications as well.

For example, one of the restraint devices 100, 200, and 300 according to example embodiments described above in FIGS. 1-6, 7, and 8 (and/or variations thereof) may be attached around a portion of the main feedwater pipe 125 that is outside the body B and adjacent to the joint between the main feedwater pipe 125 and the feedwater nozzle 122.

By attaching one of the above-described restraint devices 100, 200, and 300 around the main feedwater pipe 125, the restraint device may protect the safety-related components from fluids if the main feedwater pipe 125 bursts and/or breaks and may take up a smaller footprint than a cooling system pool and/or bio-shield wall used in general reactor pressure vessels.

Additionally, the restraint devices 100, 200, and 300 are configured to limit and/or contain loads created by a break in the main feedwater pipe 125 without overloading other structures. For example, similar to the conduit structure 10, the main feedwater pipe 125 may include a portion with a raised surface to limit and/or restrict loads created from a break in the main feedwater pipe 125 (see the portion 15 on the conduit structure 10 in FIG. 3). Also, Belleville washers 45 and/or engineered-crush material 47 may be positioned between the main feedwater pipe 125 and the collar parts wrapped around the main feedwater pipe 125 in order to absorb loads if the main feedwater pipe 125 breaks or bursts. Additionally, because the collar parts may be connected end-to-end to each other around a portion of the main feedwater pipe 125, the collar parts may be configured to at least partially contain a break in the main feedwater pipe 125 at a location surrounded by the collar parts.

Additionally, the restraint devices 100, 200, 300 may be assembled and/or disassembled using a simplified process. Thus, in some example embodiments, the restraint devices 100, 200, 300 may be attached to the main feedwater pipe 125 connected to the feedwater nozzle 122 using a simplified process. Additionally, for maintenance inspection, the restraint devices 100, 200, and 300 may be quickly disassembled to gain access to locations of the main feedwater pipe 125 and/or feedwater nozzle 122. Alternatively, for maintenance inspection and/or for responding to a conduit structure burst, in some example embodiments, one or more of the collar parts of the restraint devices 100, 200, and 300 may be removed and the remaining collar parts may be rotated (or pivoted) to inspect a location of the main feedwater pipe 125 and/or at least partially contain a location of main feedwater pipe 125 burst or break.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of attaching a restraint device to a conduit structure connected to a nozzle structure that includes brackets on an outer surface of the nozzle structure, the method comprising:
    inserting a first end of rods into the brackets such that a remaining part of each of the rods extends from the brackets over a portion of the conduit structure;
    connecting collar parts to the rods,
    the collar parts each including a side that defines a threaded hole,
    the connecting collar parts to the rods including positioning the collar parts spaced apart from the brackets by inserting a second end of each of the rods into a corresponding threaded hole among the threaded holes defined by the collar parts; and
    pinning the collar parts to each other end-to-end such that the collar parts pinned to each other wrap around the portion of the conduit structure.

2. The method of claim 1, further comprising:
    inserting one or more Belleville washers between the portion of the conduit structure and at least one of the collar parts.

3. The method of claim 1, further comprising:
    inserting engineered-crush material between the portion of the conduit structure and at least one of the collar parts.

4. The method of claim 1, wherein the brackets are clevis brackets connected to the nozzle structure using clevis pins.

* * * * *